(12) United States Patent

Takeuchi (10) Patent No.: US 8,798,203 B2
(45) Date of Patent: Aug. 5, 2014

(54) SIGNAL PROCESSING APPARATUS AND SIGNAL PROCESSING METHOD (71) Applicant: Sony Corporation, Tokyo (JP)

(72) Inventor: Hidenori Takeuchi, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 13/857,212

(22) Filed: Apr. 5, 2013

(65) Prior Publication Data

US 2013/0272450 A1 Oct. 17, 2013

(30) Foreign Application Priority Data

Apr. 12, 2012 (JP) ................................. 2012-091020

(51) Int. Cl.
H04L 27/20 (2006.01)
(52) U.S. Cl.
USPC .......................................... 375/308; 375/295
(58) Field of Classification Search
USPC .......................................... 375/308, 302, 295
See application file for complete search history.

(56) References Cited

U.S. PATENT DOCUMENTS

| 3,931,578 | A | * | 1/1976 | Gittinger | .................... 455/189.1 |
| 2004/0091066 | A1 | * | 5/2004 | Noe | .............................. 375/332 |
| 2006/0152257 | A1 | * | 7/2006 | Yamamoto | ..................... 327/116 |
| 2009/0163161 | A1 | * | 6/2009 | Robinson et al. | ............. 455/140 |
| 2009/0226165 | A1 | * | 9/2009 | Tanaka et al. | .................... 398/25 |
| 2011/0148535 | A1 | * | 6/2011 | Lee | ........................... 331/117 FE |
| 2012/0119827 | A1 | * | 5/2012 | Ito | ................................. 329/353 |

* cited by examiner

Primary Examiner — Chieh M Fan
Assistant Examiner — Brian J Stevens
(74) Attorney, Agent, or Firm — Sony Corporation (57) ABSTRACT Disclosed herein is a signal processing apparatus including: a frequency multiplier configured to carry out an N-times frequency multiplication process on a modulated signal obtained as a result of an N phase shift keying modulation process in order to generate a multiplied frequency signal; and an oscillator configured to oscillate the multiplied frequency signal as an injected signal in order to generate a signal obtained by carrying out a by-N frequency division process on the multiplied frequency signal to serve as a reproduced carrier which is a carrier reproduced from the modulated signal.

11 Claims, 8 Drawing Sheets

BPSK-SIGNAL RECEIVER USING THE CIRCUIT

SIGNAL PROCESSING APPARATUS AND SIGNAL PROCESSING METHOD

The present disclosure claims priority to Japanese Priority Patent Application JP 2012-091020 filed in the Japan Patent Office on Apr., 12, 2012, the entire content of which is hereby incorporated by reference.

BACKGROUND

The present disclosure relates to a signal processing apparatus and a signal processing method. More particularly, the present disclosure relates to a signal processing apparatus typically capable of reproducing a carrier by making use of a circuit having a small size and capable of reducing the power consumption and relates to a signal processing method provided for the apparatus.

In radio communication, for example, a transmitting apparatus modulates a carrier in accordance with data to be transmitted as an object of the transmission and then transmits a modulated signal obtained as a result of the modulation by adoption of the radio communication technique. Then, a receiving apparatus detects the modulated signal in order to convert the modulated signal into a baseband signal and, then, demodulates the baseband signal in order to obtain received data corresponding to the transmitted data.

There are a variety of methods adapted to detect a modulated signal. Typical examples of the methods are synchronous detection (or product detection), square-law detection and envelope detection. In order to adopt the synchronous detection, in the receiving apparatus, it is necessary to reproduce a carrier synchronous to the carrier used in the transmitting apparatus.

A carrier obtained as a result of reproduction of a carrier synchronous to the carrier used in the transmitting apparatus is referred to as a reproduced carrier.

A typical example of the method to reproduce a carrier is a method adopting a frequency multiplication technique. For more information on the method adopting a frequency multiplication technique (refer to documents such as Japanese Patent Publication No. Hei 06-042684 and Japanese Patent Publication No. Hei 06-012902).

SUMMARY

In accordance with the frequency multiplication technique, a frequency multiplier multiplies a modulated signal and a frequency divider divides thus-obtained multiplied frequency signal, whereby the carrier is reproduced.

When the frequency divider is used to process a modulated signal which is a signal in a high-frequency band, the configuration of the frequency divider becomes complicated and the power consumption rises.

Thus, there is raised a demand for innovation of a technology capable of reproducing a carrier by making use of a circuit having a small size and reducing the power consumption even if the modulated signal is a signal in a high-frequency band.

The present disclosure have been made in view of the circumstances described above, and it is desirable to provide a signal processing apparatus and a signal processing method which are capable of reproducing a carrier by making use of a circuit having a small size at a reduced power consumption.

In accordance with an embodiment of the present disclosure, there is provided a signal processing apparatus including:

a frequency multiplier configured to carry out an N-times frequency multiplication process on a modulated signal obtained as a result of an N phase shift keying modulation process in order to generate a multiplied frequency signal; and an oscillator configured to oscillate the multiplied frequency signal as an injected signal in order to generate a signal obtained by carrying out a by-N frequency division process on the multiplied frequency signal to serve as a reproduced carrier which is a carrier reproduced from the modulated signal.

In the following description, an N-times frequency multiplication process means a process to multiply a frequency by N whereas a by-N frequency division process means a process to divide a frequency by N.

In accordance with another embodiment of the present disclosure, there is provided a signal processing method including:

carrying out an N-times frequency multiplication process on a modulated signal obtained as a result of an N phase shift keying modulation process in order to generate a multiplied frequency signal;

supplying the multiplied frequency signal to an oscillator as an injected signal; and making use of oscillation of the oscillator to generate a signal obtained by carrying out a by-N frequency division process on the multiplied frequency signal to serve as a reproduced carrier which is a carrier reproduced from the modulated signal.

As described above, in accordance with the embodiments of the present disclosure, the N-times frequency multiplication process is carried out on the modulated signal obtained as a result of the N phase shift keying modulation process in order to generate the multiplied frequency signal. The oscillator oscillates the multiplied frequency signal as the injected signal. Due to oscillation of the oscillator, the signal obtained by carrying out the by-N frequency division process on the multiplied frequency signal is generated as the reproduced carrier which is the carrier reproduced from the modulated signal.

It is to be noted that the signal processing apparatus may be an independent apparatus or may be an internal block in a configuration of an apparatus.

In accordance with the present disclosure, a carrier can be reproduced. Particularly, in accordance with the embodiments of the present disclosure, a carrier can be reproduced by making use of a circuit having a small size at a reduced power consumption.

DETAILED DESCRIPTION OF THE PREFERRED EMBODIMENT

[Typical Configuration of Electronic Equipment to which Present Disclosure can be Applied]

Figure 1:
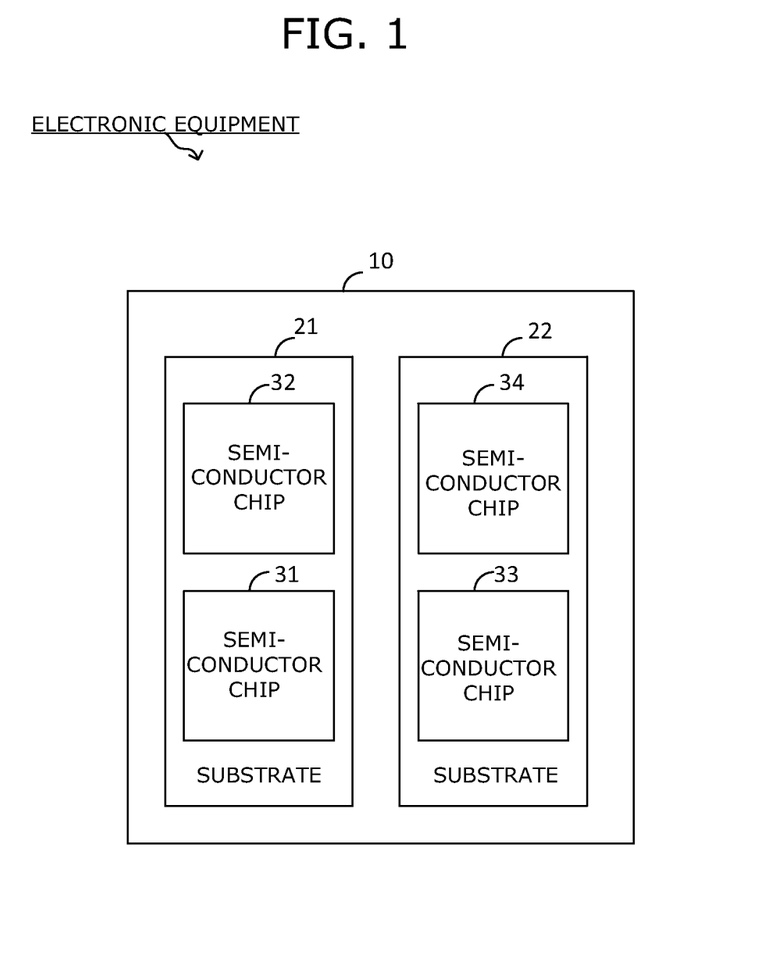
FIG. 1 is a diagram showing a top view of a typical configuration of electronic equipment to which the present disclosure can be applied.

FIG. 1 is a diagram showing a top view of a typical configuration of electronic equipment to which the present disclosure can be applied.

As shown in the figure, electronic equipment includes substrates 21 and 22 accommodated in a case 10 made of a material such as a metal.

Semiconductor chips (each also referred to as a package) 31 and 32 are mounted on the substrate 21, and semiconductor chips 33 and 34 are mounted on the substrate 22.

The semiconductor chips 31 to 34 are chips made of a material such as a CMOS (Complementary Metal Oxide Semiconductor) to carry out predetermined signal processing to exhibit functions of the electronic equipment. The semiconductor chips 31 to 34 have radio functions to exchange data by adoption of a radio technique. The exchanged data includes data to be processed in signal processing, data obtained as a result of signal processing and other kinds of data.

The semiconductor chips 31 to 34 include communication apparatuses configured to carry out radio communications in addition to circuits configured to carry out the predetermined signal processing.

In the communication apparatuses included in the semiconductor chips 31 to 34, wave outputs are adjusted so that the apparatuses are capable of carrying out only radio communications along sufficiently short distances such as 1 cm or shorter. Thus, the semiconductor chips 31 to 34 as well as the substrates 21 and 22 are provided at such locations that two specific ones, which carry out radio communications, of the semiconductor chips 31 to 34 are separated away from each other by a sufficiently short distance.

That is to say, for example, two arbitrary chips selected from the semiconductor chips 31 to 34 shown in FIG. 1 carry out radio communications. Thus, the semiconductor chips 31 to 34 as well as the substrates 21 and 22 are provided at such locations that the two arbitrary chips selected from the semiconductor chips 31 to 34 are separated away from each other by a sufficiently short distance.

The two arbitrary chips selected from the semiconductor chips 31 to 34 are capable of exchanging data with each other by adoption of a wire communication method in addition to a radio communication method. If the two arbitrary chips selected from the semiconductor chips 31 to 34 exchange data with each other by adoption of the wire communication method, wires are provided to electrically connect the two chips to each other.

[Typical Configuration of a Communication Apparatus]

Figure 2:
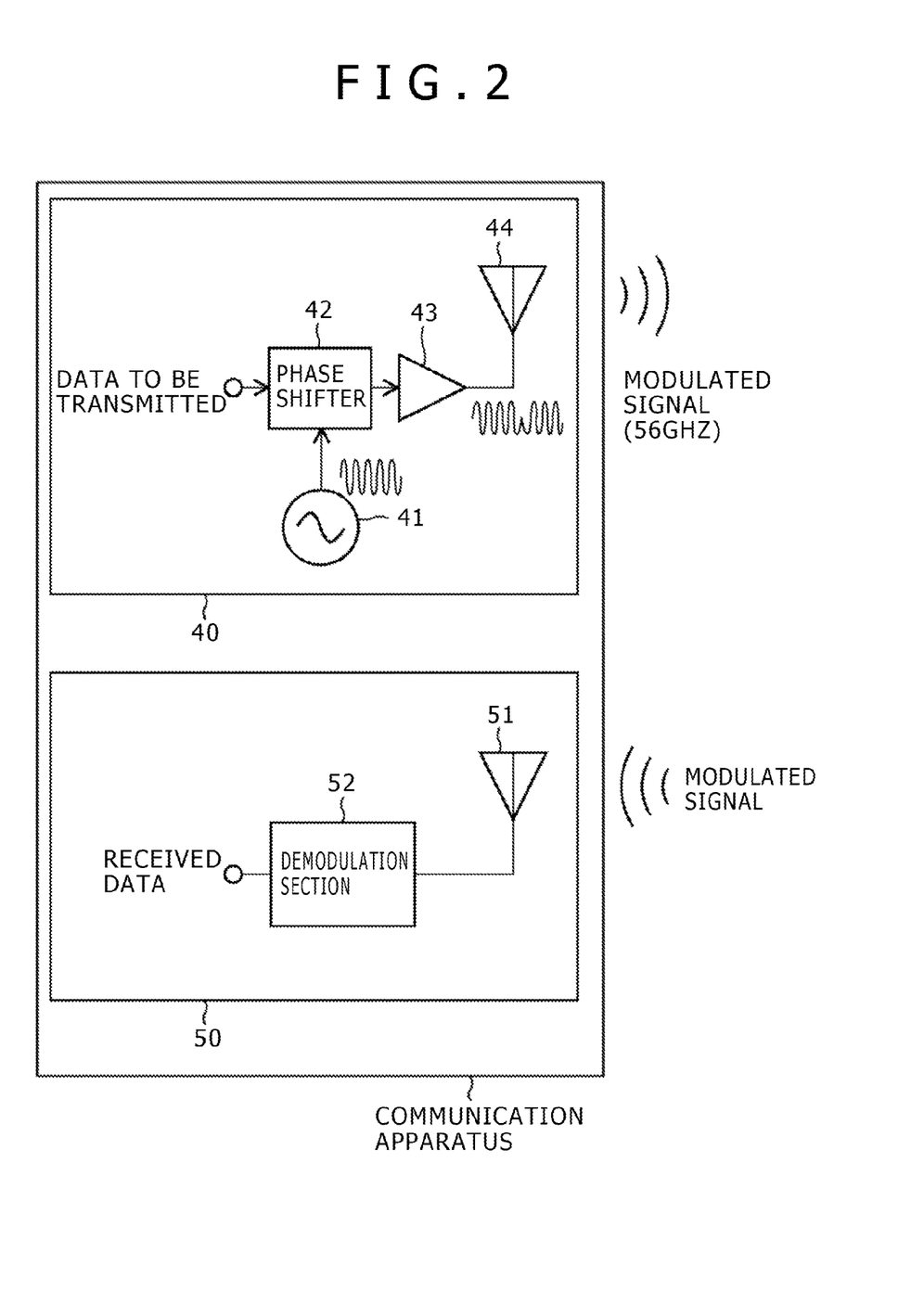
FIG. 2 is a block diagram showing a typical configuration of a communication apparatus constructed on semiconductor chips shown in FIG. 1.

FIG. 2 is a block diagram showing a typical configuration of a communication apparatus constructed on the semiconductor chips 31 to 34 shown in FIG. 1.

As shown in FIG. 2, the communication apparatus includes a signal transmitting device 40 and a signal receiving device 50 and carries out radio communications typically in a millimeter waveband.

A millimeter wave is a wave having a frequency in a range of about 30 to 300 GHz. That is to say, a millimeter wave is a wave having a wavelength in a range of about 1 to 10 mm. Since a millimeter wave has a high frequency, data can be transmitted at a high-speed data rate and radio communications can be carried out by making use of small antennas.

It is to be noted that the semiconductor chips 31 to 34 include a semiconductor chip serving as a communication apparatus used only to transmit data by adoption of the radio communication technique and include a semiconductor chip serving as a communication apparatus used only to receive data by adoption of the radio communication technique. The communication apparatus used only to transmit data by adoption of the radio communication technique may include only the signal transmitting device 40. The communication apparatus used only to receive data by adoption of the radio communication technique may include only the signal receiving device 50.

The signal transmitting device 40 includes an oscillator 41, a phase shifter 42, an amplifier 43 and an antenna 44.

The oscillator 41 oscillates in order to generate a carrier in a millimeter waveband of typically a frequency of 56 GHz and supplies the carrier to the phase shifter 42.

In addition to the carrier supplied from by the oscillator 41, the phase shifter 42 receives data to be transmitted as an object of transmission from a circuit not shown in the figure.

The data to be transmitted is typically data having a data rate of about 10 Gbps.

The phase shifter 42 carries out phase (shift) modulation on the carrier, which is received from the oscillator 41, by adjusting the phase of the carrier in accordance with the data to be transmitted. The phase shifter 42 then supplies a modulated signal obtained as a result of the phase (shift) modulation to the amplifier 43.

The phase modulation is typically BPSK (Binary Phase Shift Keying) modulation or QPSK (Quadrature Phase Shift Keying) modulation.

If the phase modulation is the BPSK modulation, for example, the phase shifter 42 sustains the phase of the carrier received from the oscillator 41 as it is or rotates the phase by π (radian) in accordance with the data to be transmitted in one-bit units.

The phase shifter 42 supplies the modulated signal to the amplifier 43 which amplifies the signal and outputs the amplified signal to the antenna 44.

The antenna 44 is configured typically from a bonding wire of about 1 mm. The antenna 44 transmits the modulated signal, which is received from the amplifier 43, as waves.

The signal receiving device 50 includes an antenna 51 and a demodulation section 52.

Much like the antenna 44, the antenna 51 is configured typically from a bonding wire of about 1 mm. The antenna 51 receives a modulated signal as waves from the communication apparatus of another semiconductor chip and supplies the modulated signal to the demodulation section 52.

The demodulation section 52 typically carries out synchronous detection on the modulated signal supplied from the antenna 51 in order to convert the modulated signal into a baseband signal. Then, the demodulation section 52 demodulates the baseband signal in order to generate the data transmitted by the signal transmitting device 40. To put it accurately, by demodulating the baseband signal, the demodulation section 52 generates data corresponding to the data transmitted by the signal transmitting device 40. Then, the demodulation section 52 outputs the data obtained as a result of the demodulation as received data.

It is to be noted that, in the configurations shown in FIG. 2, the antenna 44 and the antenna 51 can also be implemented as a single antenna.

[Typical Configuration of the Demodulation Section 52]

Figure 3:
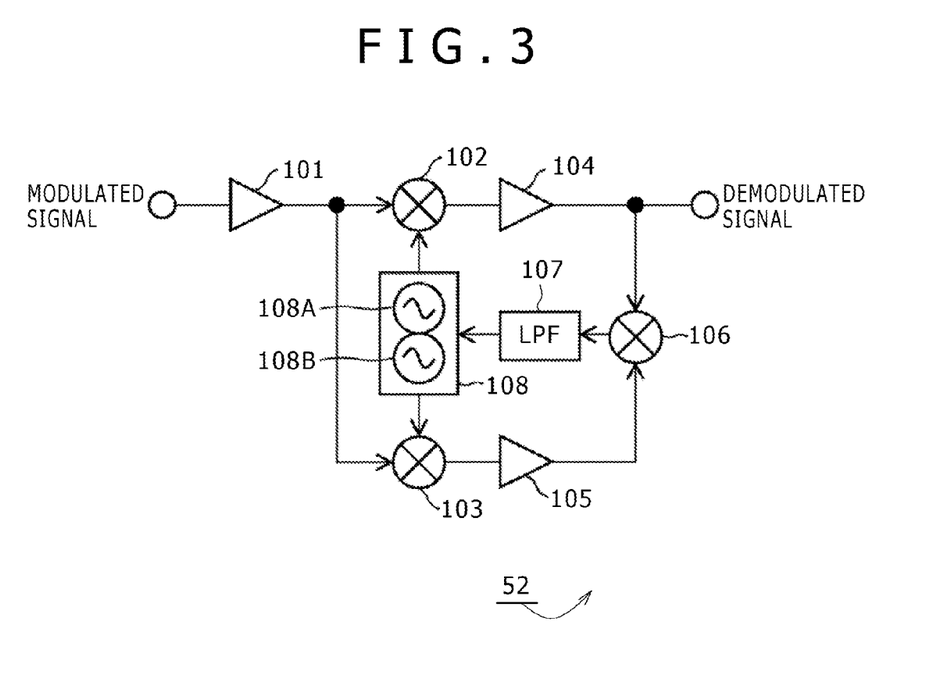
FIG. 3 is a block diagram showing a first typical configuration of a demodulation section shown in FIG. 2.

FIG. 3 is a block diagram showing a first typical configuration of the demodulation section 52 shown in FIG. 2.

In FIG. 3, the demodulation section 52 is configured using a Costas loop.

To put it concretely, as shown in FIG. 3, the demodulation section 52 includes an amplifier 101, mixers 102 and 103, amplifiers 104 and 105, a mixer 106, an LPF (Low Pass Filter) 107 and a VCO (Voltage Controlled Oscillator) block 108.

The amplifier 101 receives the modulated signal from the antenna 51 shown in FIG. 2.

The amplifier 101 amplifies the modulated signal and supplies the amplified signal to the mixers 102 and 103.

In addition to the modulated signal received from the amplifier 101, the mixer 102 also receives a reproduced carrier from the VCO block 108. The reproduced carrier is a carrier obtained by reproducing the carrier used in the modulation to generate the modulated signal.

The VCO block 108 has a VCO 108A and a VCO 108B. The VCO 108A and the VCO 108B output reproduced carriers. Each of the reproduced carriers is a signal obtained as a result of oscillation.

It is to be noted that the reproduced carriers output by the VCO 108A and the VCO 108B are carriers having different phases. The difference in phase between the carriers is $\pi/2$.

The VCO 108A and the VCO 108B output the reproduced carriers to the mixers 102 and 103, respectively.

The mixer 102 multiplies the modulated signal received from the amplifier 101 by the reproduced carrier received from the VCO 108A in order to produce a baseband signal I and supplies the signal I to the amplifier 104.

The amplifier 104 amplifies and outputs the signal I received from the mixer 102. The amplified signal is subjected to low-pass filtering carried out by a filter not shown in the figure. The filtered signal is output as a demodulated signal and supplied to the mixer 106.

The mixer 103 multiplies the modulated signal received from the amplifier 101 by the reproduced carrier received from the VCO 108B in order to produce a baseband signal Q and supplies the signal Q to the amplifier 105. As described above, the reproduced carrier generated by the VCO 108B has a phase with a difference of $\pi/2$ from the phase of the reproduced carrier generated by the VCO 108A.

The amplifier 105 amplifies the signal Q received from the mixer 103 and supplies the amplified signal to the mixer 106.

The mixer 106 multiplies the signal I received from the amplifier 104 by the signal Q received from the amplifier 105 in order to detect a phase error of the reproduced carrier and supplies the phase error to the LPF 107. The phase error is a phase error from the phase of the carrier used in the modulation carried out to generate the modulated signal.

The LPF 107 carries out filtering on the phase error received from the mixer 106 in order to remove high-frequency components from the phase error. The phase error output by the LPF 107 as a result of the filtering is supplied to the VCO block 108 as a fed-back control signal adapted to control the VCO block 108.

Each of the VCO 108A and the VCO 108B which are employed in the VCO block 108 oscillates an oscillating signal at an oscillation frequency according to the control signal received from the LPF 107. The VCO block 108 supplies one of the oscillating signals, which are obtained as a result of the oscillation, as the reproduced carrier.

If the demodulation section 52 is configured as a Costas loop as described above, the circuit is complicated and an area occupied by the circuit is large.

Figure 4:
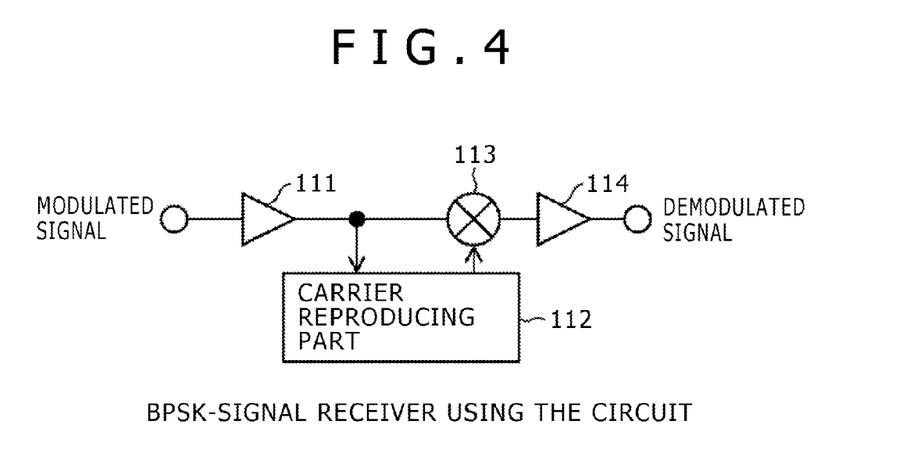
FIG. 4 is a block diagram showing a second typical configuration of the demodulation section.

FIG. 4 is a block diagram showing a second typical configuration of the demodulation section 52 shown in FIG. 2.

In FIG. 4, the demodulation section 52 includes an amplifier 111, a carrier reproducing part 112, a mixer 113 and an amplifier 114.

The amplifier 111 receives the modulated signal from the antenna 51 shown in FIG. 2.

The amplifier 111 amplifies the modulated signal and supplies the amplified signal to the carrier reproducing part 112 and the mixer 113.

The carrier reproducing part 112 makes use of the modulated signal received from the amplifier 111 in order to reproduce a carrier used in the modulation to generate the modulated signal. The carrier reproducing part 112 then supplies the carrier to the mixer 113 as a reproduced carrier.

The mixer 113 multiplies the modulated signal received from the amplifier 111 by the reproduced carrier received from the carrier reproducing part 112 in order to generate a baseband signal obtained as a result of the multiplication. The mixer 113 supplies the baseband signal to the amplifier 114.

The amplifier 114 amplifies and outputs the baseband signal received from the mixer 113. The baseband signal output by the amplifier 114 is subjected to filtering carried out by an LPF not shown in the figure and is output as a demodulated signal.

Figure 5:
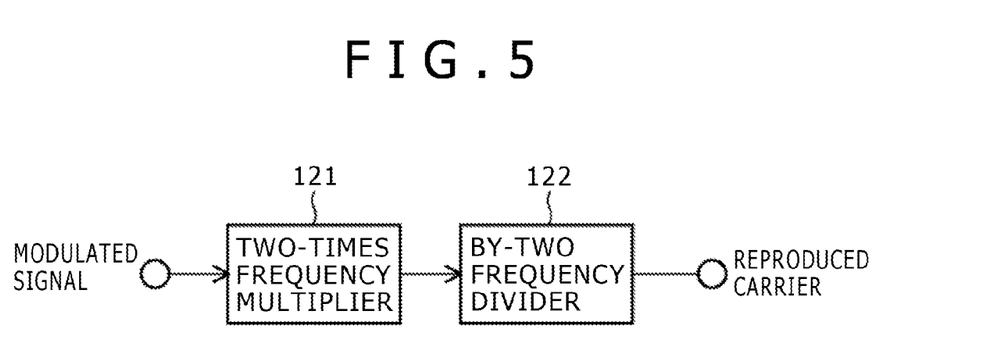
FIG. 5 is a block diagram showing a first typical configuration of a carrier reproducing part shown in FIG. 4.

FIG. 5 is a block diagram showing a first typical configuration of the carrier reproducing part 112 shown in FIG. 4.

As shown in FIG. 5, the carrier reproducing part 112 includes a two-times frequency multiplier 121 and a by-two frequency divider 122.

The two-times frequency multiplier 121 receives the modulated signal from the amplifier 111 shown in FIG. 4.

It is to be noted that, in this case, the modulated signal supplied by the amplifier 111 to the two-times frequency multiplier 121 is a BPSK signal.

The two-times frequency multiplier 121 carries out a frequency doubling process on the BPSK signal received from the amplifier 111 shown in FIG. 4 and outputs the doubled frequency signal to the by-two frequency divider 122.

The BPSK signal cited above is a signal changing the phase thereof from a specific one of two values to the other value, that is, from 0 to $\pi$, and vice versa. The multiplied frequency signal obtained as a result of the frequency doubling process carried out on the BPSK signal is a single-phase signal, the phase of which does not change.

The by-two frequency divider 122 carries out a frequency division process on the multiplied frequency signal received from the two-times frequency multiplier 121 in order to divide the frequency of the multiplied frequency signal by two. The by-two frequency divider 122 outputs a reproduced carrier which is a signal having a frequency equal to the frequency of the BPSK signal output by the amplifier 111. The signal having a frequency equal to the frequency of the BPSK signal output by the amplifier 111 is a signal obtained as a result of the frequency division process.

Figure 6:
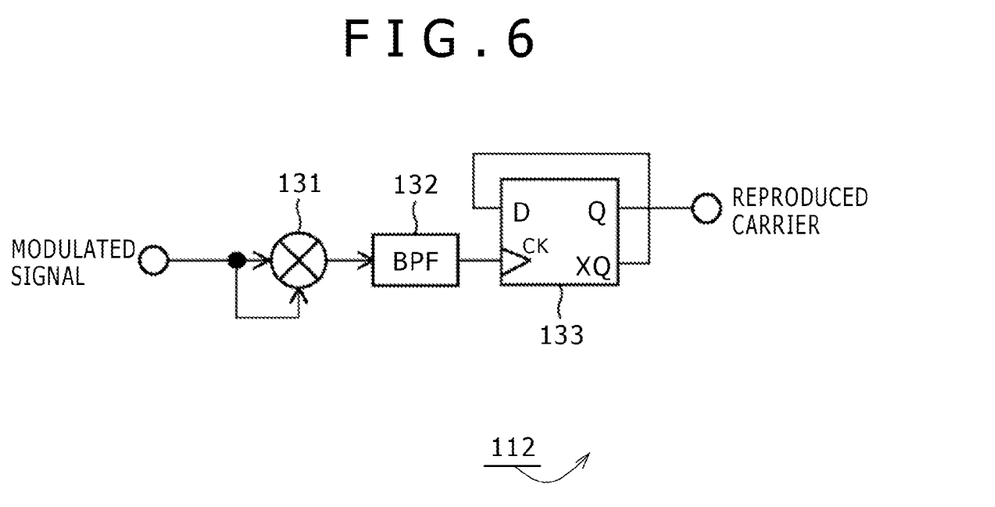
FIG. 6 is a block diagram showing a second typical configuration of the carrier reproducing part.

FIG. 6 is a block diagram showing a second typical configuration of the carrier reproducing part 112.

In FIG. 6, the carrier reproducing part 112 includes a multiplier 131, a BPF (Band Pass Filter) 132 and a D flip-flop 133.

The multiplier 131 receives the modulated signal from the amplifier 111 shown in FIG. 4.

It is to be noted that the modulated signal supplied by the amplifier 111 to the multiplier 131 is a BPSK signal.

The multiplier 131 multiplies the BPSK signal received from the amplifier 111 by the BPSK signal itself in order to produce a squared signal which is a signal obtained by squaring the BPSK signal. The multiplier 131 outputs the squared signal to the BPF 132.

The squared signal obtained by squaring the BPSK signal includes a signal having a frequency equal to two times the frequency of the BPSK signal.

The BPF 132 carries out filtering on the squared signal received from the multiplier 131 in order to extract a signal, which has a frequency equal to two times the frequency of the BPSK signal received from the amplifier 111, from the squared signal. The BPF 132 supplies the extracted signal to a clock terminal CK of the D flip-flop 133.

An input terminal D of the D flip-flop 133 is connected to an inverted output terminal XQ of the D flip-flop 133. The inverted output terminal XQ outputs an inverted signal which is a signal obtained by inverting an output signal generated at an output terminal Q of the D flip-flop 133.

The inverted signal output by the inverted output terminal XQ to the input terminal D is latched in the D flip-flop 133 synchronously with the signal supplied to the clock terminal CK as a signal having a frequency equal to two times the frequency of the BPSK signal. The signal latched in the D flip-flop 133 is output from the output terminal Q.

The output signal generated at the output terminal Q is supplied to the mixer 113 shown in FIG. 4 as a reproduced carrier.

In the carrier reproducing part 112 shown in FIG. 5, if the modulated signal is a high-frequency signal such as a millimeter-wave signal, the configuration of the by-two frequency divider 122 is complicated and the power consumption is large.

In the carrier reproducing part 112 shown in FIG. 6, if the modulated signal is a high-frequency signal such as a millimeter-wave signal, the configuration of the D flip-flop 133 is complicated.

Figure 7:
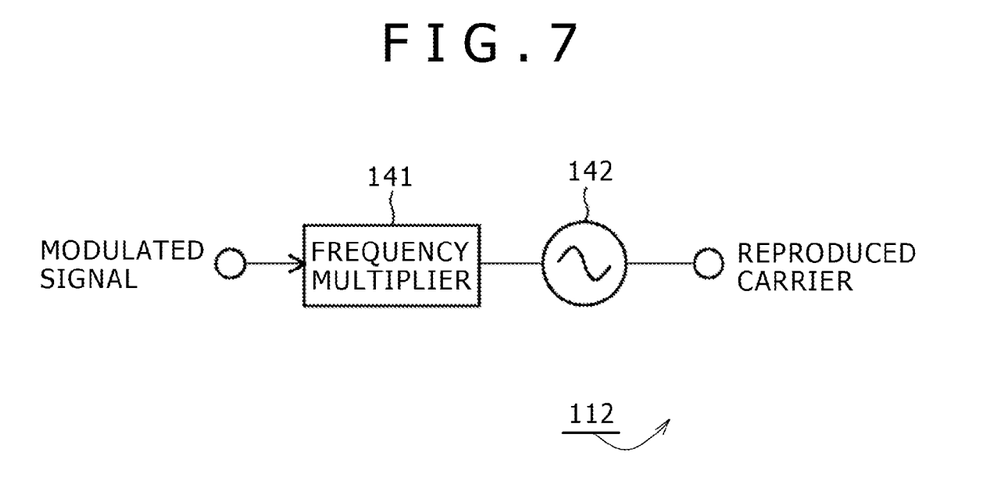
FIG. 7 is a block diagram showing a typical configuration of a carrier reproducing part functioning as a signal processing apparatus according to an embodiment of the present disclosure.

FIG. 7 is a block diagram showing a typical configuration of the carrier reproducing part 112 functioning as a signal processing apparatus according to an embodiment of the present disclosure.

In FIG. 7, the carrier reproducing part 112 includes a frequency multiplier 141 and an oscillator 142.

The frequency multiplier 141 receives the modulated signal from the amplifier 111 shown in FIG. 4.

The frequency multiplier 141 carries out a frequency multiplication process on the modulated signal received from the amplifier 111 and provides the oscillator 142 with a multiplied frequency signal which is a signal obtained as a result of the frequency multiplication process.

In the frequency multiplication process carried out by the frequency multiplier 141, the frequency of the modulated signal is multiplied by a number determined in advance on the basis of the modulated signal.

If the modulated signal supplied by the amplifier 111 to the frequency multiplier 141 is a signal obtained as a result of an N phase shift keying modulation process, the frequency multiplier 141 carries out an N-times frequency multiplication process of multiplying the frequency of the modulated signal by N.

If the modulated signal is a BPSK signal for example, the frequency multiplier 141 carries out a two-times frequency multiplication process of multiplying the frequency of the modulated signal by two. If the modulated signal is a QPSK signal, the frequency multiplier 141 carries out a four-times frequency multiplication process of multiplying the frequency of the modulated signal by four.

The oscillator 142 oscillates the multiplied frequency signal received from the frequency multiplier 141 as an injected signal and generates a reproduced carrier which is a signal obtained as a result of a by-N frequency division process of dividing the frequency of the multiplied frequency signal by N.

Figure 8:
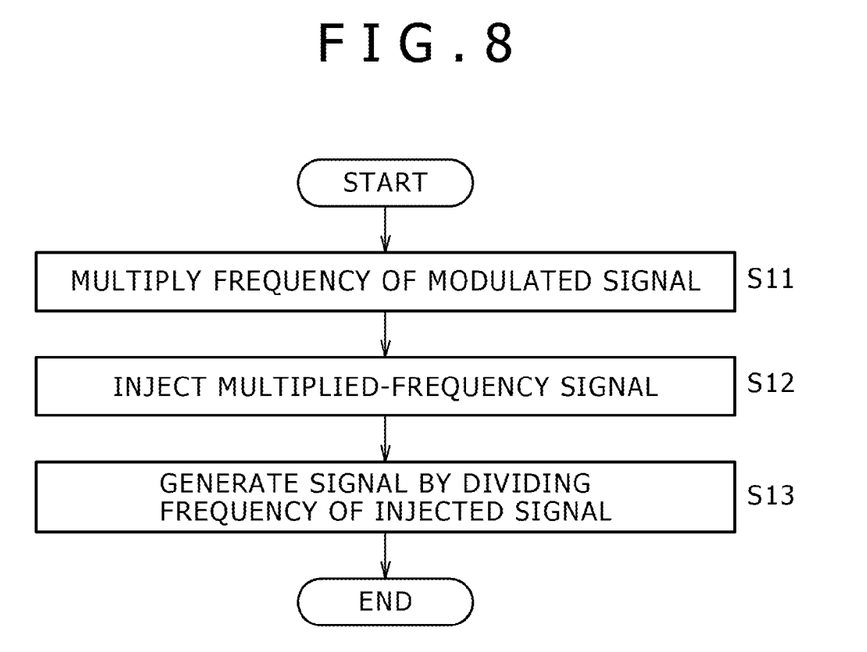
FIG. 8 is a flowchart to be referred to in explanation of operations carried out by the carrier reproducing part.

FIG. 8 is a flowchart referred to in the following explanation of operations carried out by the carrier reproducing part 112 shown in FIG. 7.

As shown in FIG. 8, the flowchart begins with a step S11 at which the frequency multiplier 141 carries out the N-times frequency multiplication process on a modulated signal in order to generate a multiplied frequency signal. Supplied by the amplifier 111 to the frequency multiplier 141, the modulated signal is a signal obtained as a result of the N phase shift keying modulation process. The flow of the operations then goes on to the next step S12.

At the step S12, the frequency multiplier 141 supplies (or injects) the multiplied frequency signal to the oscillator 142 to function as an injected signal which serves as a so-called seed of injection synchronization. As described above, the multiplied frequency signal is a signal obtained as a result of the N-times frequency multiplication process. The flow of the operations then goes on to the next step S13.

At the step S13, the oscillator 142 oscillates the multiplied frequency signal supplied by the frequency multiplier 141 to function as the injected signal and, due to the oscillation, generates a reproduced carrier which is a signal obtained by dividing the frequency of the multiplied frequency signal functioning as the injected signal by N.

[Typical Configurations of the Frequency Multiplier 141 and Oscillator 142]

Figure 9:
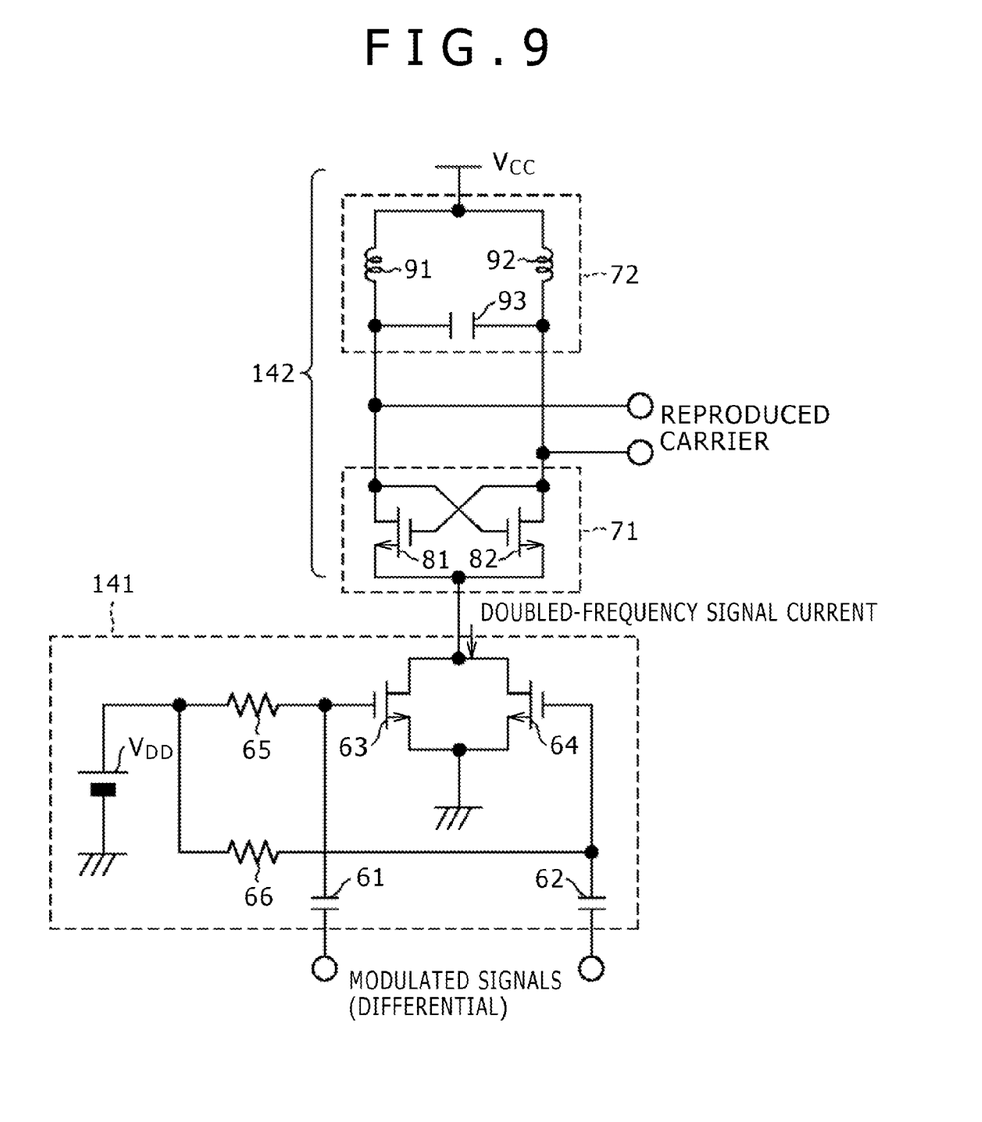
FIG. 9 is a circuit diagram showing typical configurations of a frequency multiplier and an oscillator.

FIG. 9 is a circuit diagram showing typical configurations of the frequency multiplier 141 and the oscillator 142 which are shown in FIG. 7.

To be more accurate, FIG. 9 is a circuit diagram showing typical configurations of the frequency multiplier 141 and the oscillator 142 for a case in which the modulated signal is a BPSK signal.

The frequency multiplier 141 receives a BPSK signal as a modulated signal from the amplifier 111 shown in FIG. 4. The frequency multiplier 141 carries out the two-times frequency multiplication process on the BPSK signal received from the amplifier 111 in order to generate a doubled frequency signal used as an injected signal supplied to the oscillator 142. The oscillator 142 oscillates the doubled frequency signal. Due to the oscillation, the oscillator 142 generates a half-frequency signal as a reproduced carrier. The half-frequency signal is a signal obtained as a result of the by-two frequency division process of dividing the frequency of the doubled frequency signal by two.

In FIG. 9, the frequency multiplier 141 includes a differential amplifier employing a pair of transistors.

The frequency multiplier 141 has capacitors 61 and 62, FETs (Field-Effect Transistors) 63 and 64, and resistors 65 and 66.

The BPSK signal (modulated signal) received from the amplifier 111 shown in FIG. 4 as differential signals is supplied to a terminal of the capacitor 61 and a terminal of the capacitor 62.

The amplifier 111 shown in FIG. 4 outputs the BPSK signal as differential signals supplied to the specific terminal of the capacitor 61 and the specific terminal of the capacitor 62 respectively.

It is to be noted that the BPSK signal output by the amplifier 111 does not have to be differential signals. For example, the BPSK signal output by the amplifier 111 can also be a single-end signal.

The other terminal of the capacitor 61 is connected to the gate of the FET 63, and the other terminal of the capacitor 62 is connected to the gate of the FET 64.

The drain of the FET 63 is connected to the drain of the FET 64 and the source of the FET 63 is connected to the source of the FET 64. A connection point between the source of the FET 63 and the source of the FET 64 is connected to the ground.

A DC (direct current) voltage $V_{DD}$ is applied to an end of the resistor 65, the other end of which is connected to a connection point between the other terminal of the capacitor 61 and the gate of the FET 63. The DC voltage $V_{DD}$ is applied to an end of the resistor 66, the other end of which is connected to a connection point between the other terminal of the capacitor 62 and the gate of the FET 64.

In the frequency multiplier 141 shown in FIG. 9, the DC voltage $V_{DD}$ is applied to the gates of the FETs 63 and 64 through the resistors 65 and 66 respectively as a bias. The differential signals of the BPSK signal are supplied to the gates and amplified by the FETs 63 and 64 functioning as the differential amplifier.

The FETs 63 and 64 functioning as the differential amplifier amplify the BPSK signal, generating a second-order harmonic of the BPSK signal. The second-order harmonic of the BPSK signal is a multiplied frequency signal obtained by multiplying the frequency of the BPSK signal by two.

The multiplied frequency signal generated by the frequency multiplier 141 is supplied as an injected signal to the oscillator 142 by way of a connection point between the drains of the FETs 63 and 64.

As shown in FIG. 9, the oscillator 142 includes a negative-resistance circuit 71 and a LC (inductance-capacitance) resonant circuit 72 which are connected to each other.

The negative-resistance circuit 71 includes FETs 81 and 82 cross-coupled to each other.

The gate of the FET 81 is connected to the drain of the FET 82 whereas the gate of the FET 82 is connected to the drain of the FET 81. That is to say, the gate of a specific one of the FETs 81 and 82 is connected to the drain of the other one of the FETs 81 and 82 whereas the gate of the other one of the FETs 81 and 82 is connected to the drain of the specific one of the FETs 81 and 82.

The source of the FET 81 is connected to the source of the FET 82. The connection point between the sources of the FETs 81 and 82 is connected to the connection point between the drains of the FETs 63 and 64 employed in the frequency multiplier 141.

As described above, in the frequency multiplier 141, the DC voltage $V_{DD}$ is applied to the gates of the FETs 63 and 64 through the resistors 65 and 66 respectively as a bias. Thus, even if the modulated signal is not supplied to the gates of the FETs 63 and 64, the DC voltage $V_{DD}$ applied to the gates of the FETs 63 and 64 causes drain currents determined in advance to flow in the FETs 63 and 64. As a result, the FETs 63 and 64 composing the differential amplifier function as a current source.

The drain currents of the FETs 63 and 64 flow to (or from) the negative-resistance circuit 71 connected to the connection point between the drains of the FETs 63 and 64. Since the drain currents flow to (or from) the negative-resistance circuit 71 in this way, the negative-resistance circuit 71 functions as a negative resistor.

The LC resonant circuit 72 includes coils 91 and 92 as well as a capacitor 93.

One end of the coil 91 is connected to one end of the coil 92 and the connection point between the ends of the coils 91 and 92 is connected to a power supply $V_{CC}$.

The other end of the coil 91 is connected to one end of the capacitor 93 whereas the other end of the coil 92 is connected to the other end of the capacitor 93.

The negative-resistance circuit 71 and the LC resonant circuit 72 are connected to each other as follows. The drain of the FET 81 employed in the negative-resistance circuit 71 is connected to the other end of the coil 91 employed in the LC resonant circuit 72 whereas the drain of the FET 82 employed in the negative-resistance circuit 71 is connected to the other end of the coil 92 employed in the LC resonant circuit 72. The other end of the coil 91 is the connection point between the coil 91 and the capacitor 93 whereas the other end of the coil 92 is the connection point between the coil 92 and the capacitor 93. Since the negative-resistance circuit 71 and the LC resonant circuit 72 are connected to each other as described above, a current flows between the negative-resistance circuit 71 and the LC resonant circuit 72.

In the oscillator 142 including the negative-resistance circuit 71 and the LC resonant circuit 72 which are described above, the multiplied frequency signal generated by the frequency multiplier 141 is supplied as an injected signal from the connection point between the drains of the FETs 63 and 64 employed in the frequency multiplier 141 to the connection point between the sources of the FETs 81 and 82 employed in the negative-resistance circuit 71.

The oscillator 142 oscillates the multiplied frequency signal serving as the seed of oscillation and generates a reproduced carrier obtained as a result of dividing the frequency of the multiplied frequency signal by two due to the oscillation. As described above, the multiplied frequency signal is supplied as an injected signal from the frequency multiplier 141 to the connection point between the sources of the FETs 81 and 82 employed in the negative-resistance circuit 71.

Since the oscillator 142 oscillates the multiplied frequency signal serving as the seed of oscillation, drain currents of the FET 81 and the FET 82 flow through the connection points between the negative-resistance circuit 71 and LC resonant circuit 72 as differential signals. The differential signals serve as a signal having a frequency obtained by dividing the frequency of the multiplied frequency signal by two. As described above, the multiplied frequency signal is supplied as an injected signal from the frequency multiplier 141 to the connection point between the sources of the FETs 81 and 82 employed in the negative-resistance circuit 71.

The oscillator 142 provides the mixer 113 shown in FIG. 4 with the differential signals serving as the reproduced carrier having a frequency obtained by dividing the frequency of the multiplied frequency signal by two.

Figure 10A:
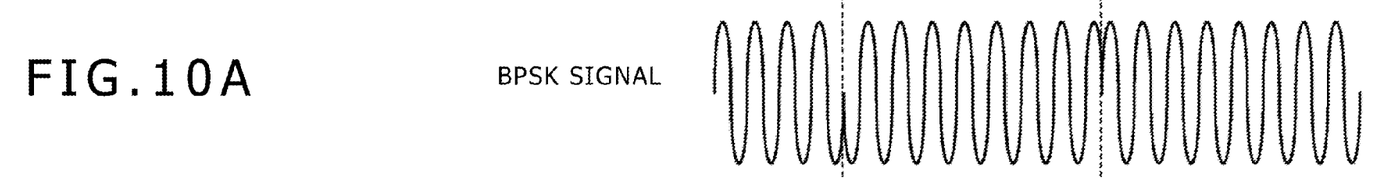
FIGS. 10A to 10C are waveform diagrams to be referred to in explanation of operations carried out by the carrier reproducing part having the frequency multiplier and the oscillator.
Figure 10B:
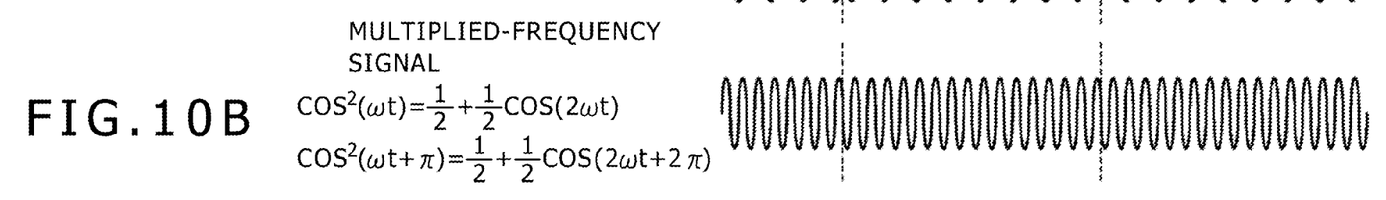
Figure 10C:
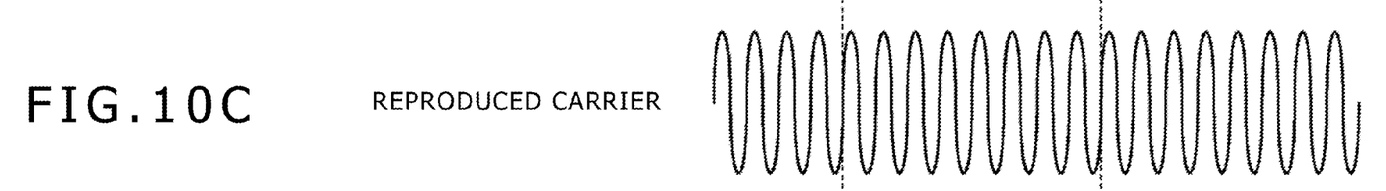

FIGS. 10A to 10C are waveform diagrams referred to in the following explanation of operations carried out by the carrier reproducing part 112 having the frequency multiplier 141 and the oscillator 142 shown in FIG. 9.

FIG. 10A shows the BPSK signal supplied to the frequency multiplier 141 as a modulated signal.

In this case, the BPSK signal y(t) can be expressed by an equation $y(t)=\cos(\omega t)$ and an equation $y(t)=\cos(\omega t+\pi)$ which has a phase obtained by rotating the phase of $\cos(\omega t)$ by $\pi$ where notation $\omega$ denotes an angular frequency of a carrier.

FIG. 10B shows the multiplied frequency signal obtained by multiplying the frequency of the BPSK signal y(t) by two.

As described before, the FETs 63 and 64 functioning as the differential amplifier in the frequency multiplier 141 shown in FIG. 9 amplify the BPSK signal y(t), generating a second-order harmonic $\{y(t)\}^2$ of the BPSK signal y(t). The second-order harmonic $\{y(t)\}^2$ of the BPSK signal y(t) is a multiplied frequency signal obtained by multiplying the frequency of the BPSK signal y(t) by two.

The second-order harmonic $\{y(t)\}^2$ of the BPSK signal y(t) is expressed as follows. For the BPSK signal y(t)=cos(ωt), there is yielded $\{\cos(\omega t)\}^2=\{1+\cos(2\omega t)\}/2$. For the BPSK signal y(t)=cos(ωt+π), there is yielded $\{\cos(\omega t+\pi)\}^2=\{1+\cos(2\omega t+2\pi)\}/2=\{1+\cos(2\omega t)\}/2$.

The multiplied frequency signal $\{y(t)\}^2$ can be expressed by an equation $\{y(t)\}^2=\{1+\cos(2\omega t)\}/2$. The multiplied frequency signal $\{y(t)\}^2$ is obtained by multiplying the frequency of the BPSK signal y(t) by two as described above. The multiplied frequency signal $\{y(t)\}^2$ is a single-phase signal, the phase of which does not change despite the fact that the BPSK signal y(t) itself is a signal changing the phase thereof from a specific one of two values to the other value, that is, from 0 to π, and vice versa. The frequency of the multiplied frequency signal $\{y(t)\}^2$ is two times the frequency of the BPSK signal y(t).

The frequency multiplier 141 supplies the multiplied frequency signal $\{y(t)\}^2$ described above to the oscillator 142 as an injected signal.

A free-running oscillation signal x(t) in the oscillator 142 can be expressed by an equation $x(t)=\cos(\omega_0 t)$ where notation $\omega_0$ denotes an angular frequency.

When the injected signal is supplied to the connection point between the sources of the FETs 81 and 82 in the negative-resistance circuit 71 of the oscillator 142, an oscillating signal z(t) is generated by oscillation taking the injected signal as the seed thereof. The oscillating signal z(t) is obtained by multiplying the injected signal by the free-running oscillation signal x(t).

In order to make the explanation simple, let the multiplied frequency signal $\{y(t)\}^2$ expressed by $\{1+\cos(2\omega t)\}/2$ be represented by an equation $\{y(t)\}^2=\cos(2\omega t)$. Since the oscillating signal z(t) is obtained as a result of multiplying the multiplied frequency signal $\{y(t)\}^2$ serving as the injected signal by the free-running oscillation signal x(t), the oscillating signal z(t) is expressed by the following equations:

$$z(t)=\{y(t)\}^2 x(t)=\cos(2\omega t)\cos(\omega_0 t)=\{\cos(2\omega t+\omega_0 t)+\cos(2\omega t-\omega_0 t)\}/2$$

The oscillation in the oscillator 142 is stable if the (angular) frequency $\omega_0$ of the free-running oscillation signal x(t) is pulled in the frequency of a low-frequency component of the oscillating signal z(t).

The low-frequency component of the oscillating signal $z(t)=\{\cos(2\omega t+\omega_0 t)+\cos(2\omega t-\omega_0 t)\}/2$ is $\cos(2\omega t-\omega_0 t)$. When the frequency $\omega_o$ of the free-running oscillation signal x(t) has been pulled in the frequency $(2\omega-\omega_0)$ of the low-frequency component $\cos(2\omega t-\omega_0 t)$ of the oscillating signal z(t), the frequency $\omega_0$ satisfies the following equation $\omega_0=2\omega-\omega_0$ or $\omega_0=\omega$. Accordingly, the oscillating signal z(t) expressed by the equation $z(t)=\{\cos(2\omega t+\omega_0 t)+\cos(2\omega t-\omega_0 t)\}/2$ is expressed by an equation $z(t)=\{\cos(3\omega t)+\cos(\omega t)\}/2$.

In the oscillator 142, the coils 91 and 92 as well as the capacitor 93 function as a BPF strikingly outputting the low-frequency component cos(ωt)/2 of the oscillating signal $z(t)=\{\cos(3\omega t)+\cos(\omega t)\}/2$.

The oscillator 142 strikingly outputs a frequency component cos(ωt) of the oscillating signal $z(t)=\{\cos(3\omega t)+\cos(\omega t)\}/2$ as a component having a frequency equal to the frequency of the carrier of the BPSK signal y(t).

The oscillator 142 outputs the frequency component cos(ωt) as a reproduced carrier.

FIG. 10C shows the reproduced carrier obtained as described above.

The resonance frequency of the LC resonant circuit 72 is adjusted to a frequency close to the frequency of the carrier of the modulated signal. The frequency close to the frequency of the carrier of the modulated signal is a frequency in a pull-in range of synchronization.

As described above, in the carrier reproducing part 112 shown in FIG. 7, the BPSK signal is subjected to the two-times frequency multiplication process and a multiplied frequency signal obtained as a result of the two-times frequency multiplication process is supplied to the oscillator 142 as an injected signal. The oscillation of the oscillator 142 generates a reproduced carrier which is a signal having a frequency equal to half the frequency of the multiplied frequency signal. In this way, it is possible to obtain a reproduced carrier without making use of a Costas loop, a frequency divider and a D flip-flop. Thus, the reproduced carrier can be generated by making use of a circuit having a small size at a reduced power consumption.

It is to be noted that, if the modulated signal is a signal obtained as a result of an ASK (Amplitude Shift Keying) modulation process for example, in the configurations shown in FIG. 9, instead of supplying the modulated signal to the gates of the FETs 63 and 64, the modulated signal is injected to the drains of the FETs 81 and 82 by way of a voltage-current converting circuit not shown in the figure. Thus, the reproduced carrier can be obtained as drain currents of the FETs 81 and 82.

Figure 11:
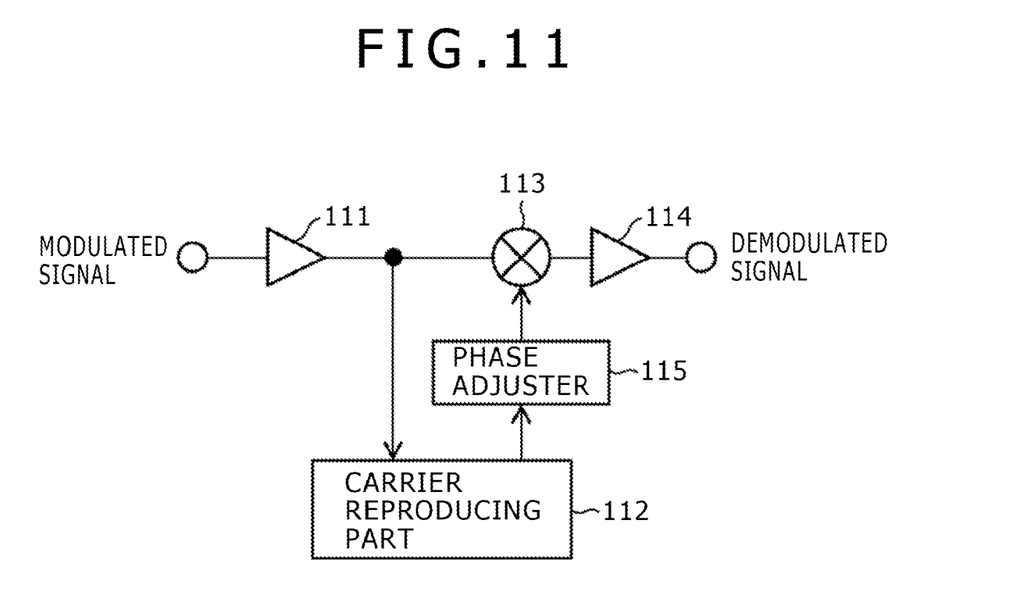
FIG. 11 is a block diagram showing a third typical configuration of the demodulation section.

FIG. 11 is a block diagram showing a third typical configuration of the demodulation section 52 shown in FIG. 2.

It is to be noted that portions shown in FIG. 11 as portions corresponding to their respective counterparts of the configuration shown in FIG. 4 are denoted by the same reference numeral as the counterparts and explanation of such portions is properly omitted from the following description.

Much like the configuration shown in FIG. 4, the demodulation section 52 shown in FIG. 11 includes an amplifier 111, a carrier reproducing part 112, a mixer 113 and an amplifier 114.

The demodulation section 52 shown in FIG. 11 is different from the demodulation section 52 shown in FIG. 4 in that the demodulation section 52 shown in FIG. 11 has also a phase adjuster 115.

The carrier reproducing part 112 shown in FIG. 11 has the same configuration as the carrier reproducing part 112 shown in FIG. 7.

The phase adjuster 115 receives a reproduced carrier from the carrier reproducing part 112.

The phase adjuster 115 adjusts the phase of the reproduced carrier received from the carrier reproducing part 112 and supplies the reproduced carrier with the adjusted phase to the mixer 113.

To put it in detail, the phase adjuster 115 adjusts the phase of the reproduced carrier received from the carrier reproducing part 112 in order to maximize the level of the output of the mixer 113 or the level of the output of the amplifier 114 and supplies the reproduced carrier with the adjusted phase to the mixer 113.

It is to be noted that implementations of the present disclosure are by no means limited to the embodiment described so far. The embodiment can be further changed in a variety of ways in a range not deviating from the gist of the present disclosure.

The embodiment of the present disclosure can also be applied to reproduction of a carrier of a modulated signal having a frequency higher or lower than that of the millimeter-wave modulated signal.

The embodiment of the present disclosure can also be applied to reproduction of a carrier of a modulated signal obtained as a result of a phase shift keying modulation process carried out to generate the modulated signal which is a signal other than the BPSK signal. A typical example of the modulated signal other than the BPSK signal is a QPSK signal.

In the carrier reproducing part 112 shown in FIG. 7, in an operation to reproduce a carrier of a modulated signal obtained as a result of an N phase shift keying modulation process, the frequency multiplier 141 multiplies the frequency of the modulated signal by N and supplies the multiplied frequency signal to the oscillator 142. The oscillator 142 oscillates the multiplied frequency signal as an injected signal and divides the frequency of the multiplied frequency signal by N. The oscillator 142 then outputs the divided frequency signal as a reproduced carrier.

For example, a carrier of a QPSK signal is reproduced as follows. The frequency multiplier 141 multiplies the frequency of the QPSK signal by four and supplies the multiplied frequency signal to the oscillator 142. The oscillator 142 oscillates the multiplied frequency signal as an injected signal and divides the frequency of the multiplied frequency signal by four. The oscillator 142 then outputs the divided frequency signal as a reproduced carrier.

In accordance with the embodiments of the present disclosure, the carrier reproducing part 112 includes the frequency multiplier 141 configured to carry out the two-times frequency multiplication process on a modulated signal in order to generate a doubled frequency signal and the oscillator 142 configured to carry out the by-two frequency division process on the doubled frequency signal in order to generate a half frequency signal by oscillation as a reproduced carrier. If the modulated signal is a QSPK signal for example, it is possible to reproduce a carrier of the QSPK signal by connecting two such carrier reproducing parts 112 at two successive stages to form a cascade connection.

It is to be noted that the present disclosure can be realized as the following implementations:

(1) A signal processing apparatus including:
a frequency multiplier configured to carry out an N-times frequency multiplication process on a modulated signal obtained as a result of an N phase shift keying modulation process in order to generate a multiplied frequency signal; and
an oscillator configured to oscillate the multiplied frequency signal as an injected signal in order to generate a signal obtained by carrying out a by-N frequency division process on the multiplied frequency signal to serve as a reproduced carrier which is a carrier reproduced from the modulated signal.

(2) The signal processing apparatus according to implementation (1), in which
the frequency multiplier carries out a two-times frequency multiplication process on a binary phase shift keying signal in order to generate the multiplied frequency signal, and
the oscillator oscillates the multiplied frequency signal as the injected signal in order to generate a signal obtained by carrying out a by-two frequency division process on the multiplied frequency signal to serve as the reproduced carrier which is the carrier reproduced from the modulated signal.

(3) The signal processing apparatus according to implementation (1) or (2), in which
the oscillator includes a resonant circuit and a negative-resistance circuit connected to each other, and
the multiplied frequency signal is injected to the negative-resistance circuit as a current flowing to the negative-resistance circuit.

(4) The signal processing apparatus according to implementation (3), in which
the negative-resistance circuit includes a pair of transistors connected to each other to form a cross-couple connection, and
the frequency multiplier is a differential amplifier making use of a pair of transistors.

(5) The signal processing apparatus according to implementation (4), in which
the negative-resistance circuit has two field-effect transistors,
the gate of a specific one of the two field-effect transistors is connected to the drain of the other one of the two field-effect transistors and the drain of the specific field-effect transistor is connected to the gate of the other field-effect transistor,
the source of the specific field-effect transistor is connected to the source of the other field-effect transistor, and
a signal resulting from an operation carried out by the differential amplifier to amplify the modulated signal is supplied to a connection point between the sources of the two field-effect transistors as the multiplied frequency signal.

(6) The signal processing apparatus according to any one of implementations (1) to (5), further including
a phase adjuster configured to adjust the phase of the reproduced carrier.

(7) The signal processing apparatus according to any one of implementations (1) to (6), in which the modulated signal is a millimeter-wave signal.

(8) A signal processing method including:
carrying out an N-times frequency multiplication process on a modulated signal obtained as a result of an N phase shift keying modulation process in order to generate a multiplied frequency signal;
supplying the multiplied frequency signal to an oscillator as an injected signal; and
making use of oscillation of the oscillator to generate a signal obtained by carrying out a by-N frequency division process on the multiplied frequency signal to serve as a reproduced carrier which is a carrier reproduced from the modulated signal.

What is claimed is:
1. A signal processing apparatus comprising:
a frequency multiplier configured to perform an N-times frequency multiplication process on a modulated signal to generate a multiplied frequency signal, wherein the modulated signal is obtained as a result of an N phase-shift keying modulation process, wherein N is greater than 1 and corresponds to a number of phases utilized in the phase-shift keying modulation process; and
an oscillator configured to oscillate the multiplied frequency signal as an injected signal to generate a signal obtained by dividing a frequency of the multiplied frequency signal by N, wherein the generated signal serves as a reproduced carrier from the modulated signal, wherein the oscillator comprises a resonant circuit and a negative-resistance circuit connected to each other, and the multiplied frequency signal is injected to the nega- tive-resistance circuit as a current flowing to the negative-resistance circuit, and wherein the negative-resistance circuit comprises a pair of transistors connected to each other to form a cross-couple connection, and the frequency multiplier is a differential amplifier making use of another pair of transistors.

2. The signal processing apparatus according to claim 1, wherein the frequency multiplier carries out a two-times frequency multiplication process on a binary phase-shift keying signal in order to generate the multiplied frequency signal, and the oscillator oscillates the multiplied frequency signal as the injected signal in order to generate a signal obtained by dividing the multiplied frequency signal by two to serve as the reproduced carrier which is the carrier reproduced from the modulated signal.

3. The signal processing apparatus according to claim 2, further comprising a phase adjuster operable to adjust the phase of the reproduced carrier.

4. The signal processing apparatus according to claim 2, wherein the modulated signal is a millimeter-wave signal.

5. The signal processing apparatus according to claim 1, wherein the negative-resistance circuit has two field-effect transistors, a gate of a specific one of the two field-effect transistors is connected to a drain of the other one of the two field-effect transistors and a drain of the specific field-effect transistor is connected to a gate of the other field-effect transistor, a source of the specific field-effect transistor is connected to a source of the other field-effect transistor, and a signal resulting from an operation carried out by the frequency multiplier to amplify the modulated signal is supplied to a connection point between the sources of the two field-effect transistors as the multiplied frequency signal.

6. The signal processing apparatus according to claim 1, further comprising a frequency divider operable to divide the multiplied frequency signal by N.

7. A signal processing method comprising:
performing an N-times frequency multiplication process on a modulated signal to generate a multiplied frequency signal, wherein the modulated signal is obtained as a result of an N phase-shift keying modulation process, wherein N is greater than 1 and corresponds to a number of phases utilized in the phase-shift keying modulation process;
supplying the multiplied frequency signal to an oscillator as an injected signal; and
using oscillation of the oscillator to generate a signal obtained by dividing a frequency of the multiplied frequency signal by N, wherein the generated signal serves as a reproduced carrier from the modulated signal, wherein the oscillator comprises a resonant circuit and a negative resistance circuit connected to each other, and the multiplied frequency signal is injected to the negative resistance circuit as a current flowing to the negative resistance circuit, and wherein the negative-resistance circuit comprises a pair of transistors connected to each other to form a cross-couple connection, and a frequency multiplier that generates the multiplied frequency signal is a differential amplifier making use of another pair of transistors.

8. The signal processing method according to claim 7, further comprising adjusting the phase of the reproduced carrier.

9. The signal processing method according to claim 7, wherein the modulated signal is a millimeter-wave signal.

10. The signal processing method according to claim 7, further comprising dividing the multiplied frequency signal by N.

11. A signal processing apparatus comprising:
a frequency multiplier operable to carry out an N times frequency multiplication process on a modulated signal to generate a multiplied frequency signal, the modulated signal obtained as a result of an N phase shift keying modulation process, wherein N is greater than 1; and
an oscillator operable to oscillate the multiplied frequency signal as an injected signal to generate a signal obtained by carrying out a by-N frequency division process on the multiplied frequency signal, wherein the generated signal serves as a reproduced carrier which is a carrier reproduced from the modulated signal,
wherein the frequency multiplier carries out a two-times frequency multiplication process on a binary phase-shift keying signal in order to generate the multiplied frequency signal, and the oscillator oscillates the multiplied frequency signal as the injected signal in order to generate a signal obtained by dividing the multiplied frequency signal by two to serve as the reproduced carrier which is the carrier reproduced from the modulated signal,
wherein the negative-resistance circuit comprises a pair of transistors connected to each other to form a cross-couple connection, and the frequency multiplier is a differential amplifier making use of a pair of transistors, wherein the oscillator comprises a resonant circuit and a negative-resistance circuit connected to each other, and the multiplied frequency signal is injected to the negative-resistance circuit as a current flowing to the negative-resistance circuit, and
wherein the negative-resistance circuit has two field-effect transistors, the gate of a specific one of the two field-effect transistors is connected to the drain of the other one of the two field-effect transistors and the drain of the specific field-effect transistor is connected to the gate of the other field-effect transistor, the source of the specific field-effect transistor is connected to the source of the other field-effect transistor, and a signal resulting from an operation carried out by the frequency multiplier to amplify the modulated signal is supplied to a connection point between the sources of the two field-effect transistors as the multiplied frequency signal.

* * * * *